No. 647,706. Patented Apr. 17, 1900.
F. W. ROBERTSHAW.
VALVE.
(Application filed Oct. 8, 1898.)
(No Model.)
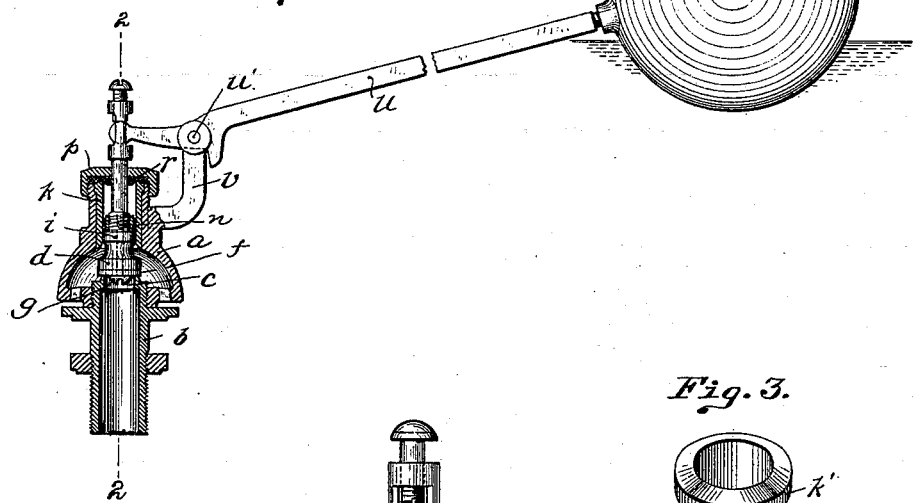
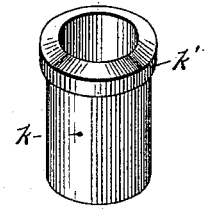
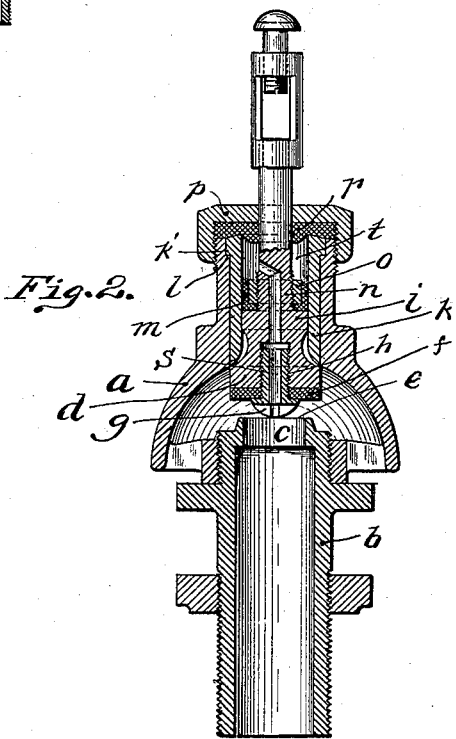
Witnesses:
Robt. C. Totten
Walter Samariss
Inventor:
Frederick W. Robertshaw
By Kay & Totten
Attorneys.
THE NORRIS PETERS CO., PHOTO-LITHO., WASHINGTON, D. C.

UNITED STATES PATENT OFFICE.

FREDERICK W. ROBERTSHAW, OF PITTSBURG, PENNSYLVANIA.

VALVE.

SPECIFICATION forming part of Letters Patent No. 647,706, dated April 17, 1900.

Application filed October 8, 1898. Serial No. 693,030. (No model.)

*To all whom it may concern:*

Be it known that I, FREDERICK W. ROBERTSHAW, a resident of Pittsburg, in the county of Allegheny and State of Pennsylvania, have invented a new and useful Improvement in Valves; and I do hereby declare the following to be a full, clear, and exact description thereof.

My invention relates to valves.

The invention has reference more particularly to that class of valves which are used in connection with water-closet or other tanks where a float is employed to actuate the valve through a suitable lever connected thereto.

The object of the invention is not only to avoid the necessity of providing for the adjustment of the float at different points on the lever or of counterbalancing the lever according to the varying pressure of the water, but to provide a valve so balanced as to act uniformly whether the pressure be increased or diminished.

To these ends my invention comprises the novel features hereinafter fully described and claimed.

To enable others skilled in the art to make and use my invention, I will describe the same more fully, referring to the accompanying drawings, in which—

Figure 1 is a vertical elevation in section of a suitable valve embodying my invention and having a lever and float connected thereto. Fig. 2 is an enlarged like view taken on the line 2 2, Fig. 1; and Fig. 3 is a perspective view of the equalizing-sleeve.

Like letters of reference indicate like parts in each.

While I have illustrated my invention in connection with a common form of valve used in water-closet tanks, yet I do not wish to confine myself in any sense to this particular style of valve, but include all others to which said invention may be found applicable.

The reference-letter $a$ designates the valve-body, to which the tubular section $b$ is connected, said tubular section forming the inlet. At the upper end of the tubular section $b$ is the opening $c$, which is controlled by the valve $d$, the upper end of said section having the seat $e$, upon which said valve rests when closed. Suitable packing $f$ is secured to the valve $d$ by means of the screw $g$, which engages the threaded seat $b$ in the valve.

The upper portion of the valve diminishes in diameter, as at $i$, and fits snugly within the equalizing-sleeve $k$. This sleeve $k$ fits within the valve-body and has the flange $k'$ at the upper end thereof, which rests on the shoulder $l$, formed in said valve-body.

Suitable cup-packing $m$ surrounds the stem $n$ of the valve, said packing being held in place by means of the nut $o$.

The bonnet $p$ engages the upper portion of the valve-body $a$, said bonnet containing the packing $r$.

Within the valve $d$ and its stem $n$ is the passage $s$, which opens communication between the space $t$ above the valve and the space below said valve.

The portion of the valve-stem which projects beyond the valve-body is engaged by the inner end of the lever $u$, said lever being fulcrumed at $u'$ to the arm $v$ on the valve-body. A float $w$ is connected to the outer end of lever $u$.

In the operation of the valve the pressure on the valve is equalized and the valve balanced for the following reason: The pressure at opening $c$ would tend to lift the valve from its seat; but by reason of the passage $s$ the pressure is permitted to accumulate in the space $t$ above the valve. This downward pressure acts to balance the valve, as the sleeve $k$ is bored to the size of the opening $c$ plus the area of the valve-stem. This gives such an even balance that to operate the valve it is only necessary to have the float of sufficient size to overcome the friction of the packing $m$ and the upper portion $i$ of the valve as they move in said sleeve.

The enlarged portion $d$ of the valve laps over the seat $e$, being larger than the opening $c$; but this admits of the use of the equalizing-sleeve, by which the balancing of the valve is readily accomplished. At the same time the sleeve can be easily removed when it is desired to remove the valve for purposes of repairing.

The valve will operate in the same manner under varying water-pressure, and the adjustment of the float at different points on the lever is done away with, as well as the necessity of a counterbalance for the lever.

What I claim as my invention, and desire to secure by Letters Patent, is—

The combination with a valve body or casing having an inlet-port and an outlet-port, of a reciprocating balanced valve arranged to control the flow of liquid through said inlet-port, a removable equalizing-sleeve in said valve body or casing through which the valve-stem projects, the outer diameter of said sleeve being at least as great as that of the valve and the cross-sectional area of the space inclosed by the inner surface of said sleeve being substantially equal to the sum of the cross-sectional areas of the valve-stem and the inlet-port, said valve having a passage that affords communication between the spaces above and below it, substantially as described.

In testimony whereof I, the said FREDERICK W. ROBERTSHAW, have hereunto set my hand.

FREDERICK W. ROBERTSHAW.

Witnesses:
ROBT. D. TOTTEN,
ROBERT C. TOTTEN.